(12) United States Patent  
Klaus et al.

(10) Patent No.: US 12,528,278 B2  
(45) Date of Patent: Jan. 20, 2026

(54) LAMINATING DEVICE AND METHOD FOR LAMINATING AT LEAST ONE LAYER STACK

(71) Applicant: Robert Bürkle GmbH, Freudenstadt (DE)

(72) Inventors: Daniel Klaus, Freudenstadt (DE); Wolfgang Renz, Freudenstadt (DE)

(73) Assignee: ROBERT BÜRKLE GMBH, Freudenstadt (DE)

( * ) Notice: Subject to any disclaimer, the term of this patent is extended or adjusted under 35 U.S.C. 154(b) by 497 days.

(21) Appl. No.: 16/964,545

(22) PCT Filed: Jan. 22, 2019

(86) PCT No.: PCT/EP2019/051518  
§ 371 (c)(1),  
(2) Date: Jul. 23, 2020

(87) PCT Pub. No.: WO2019/145308  
PCT Pub. Date: Aug. 1, 2019

(65) Prior Publication Data  
US 2020/0361169 A1    Nov. 19, 2020

(30) Foreign Application Priority Data

Jan. 23, 2018    (DE) .................... 10 2018 101 470.8

(51) Int. Cl.  
*B32B 37/10*    (2006.01)  
*B30B 15/06*    (2006.01)  
(Continued)

(52) U.S. Cl.  
CPC ............ *B32B 37/10* (2013.01); *B30B 15/064* (2013.01); *B32B 37/0046* (2013.01);  
(Continued)

(58) Field of Classification Search  
CPC ........................ B32B 37/10; B32B 37/1009  
See application file for complete search history.

(56) References Cited

U.S. PATENT DOCUMENTS

| 6,250,217 B1 * | 6/2001 | Korybutiak ............ B30B 1/003 100/211 |
| 2009/0056855 A1 | 3/2009 | Stevens |
| 2013/0000816 A1 | 1/2013 | Van Den Brand et al. |

FOREIGN PATENT DOCUMENTS

| DE | 2919285 A1 | 11/1980 |
| DE | 3300622 A1 | 7/1984 |

(Continued)

*Primary Examiner* — Michael N Orlando  
*Assistant Examiner* — John Blades  
(74) *Attorney, Agent, or Firm* — Rabin & Berdo, P.C.

(57) ABSTRACT

The invention relates to a laminating device (10) and a laminating method for laminating at least one layer stack (11), comprising at least one substantially plate-shaped workpiece (11a) and at least one adhesive material layer (11b), by means of pressure and/or heat. The laminating device comprises a lower part (12) and an upper part that can be connected to the lower part (12) in a gas-tight manner. A working chamber (14) which can be opened and closed and which is for receiving the layer stack (11) during lamination is formed between the lower part (12) and the upper part (13). A pressure plate (15) can be moved along a press axis (a-a) in the working chamber (14) between the upper part (13) and the lower part (12). At least one sealing frame (21) is arranged between the lower part (12) and the upper part (13). Multiple pressure chambers that can be separated from one another and actuated as required are arranged in the working chamber (14), wherein multiple clamping points are provided spaced apart from one another in the direction of the press axis (a-a), wherein at least one flexible element is secured on one of the clamping points for separating a first pressure chamber (18), and the moveable pressure plate (15)

(Continued)

can be moved via the application or non-application of pressure or negative pressure to said pressure chamber. Given that the flexible gas-tight element divides the working chamber (14) into a first pressure chamber (18) located above the flexible gas-tight element and a second pressure chamber (19) located below the flexible gas-tight element and in which the moveable pressure plate (15) is arranged, wherein the movement of the moveable pressure plate (15) occurs due to a pressure difference between the pressure chambers (18, 19), different operating modes of a laminating device can be performed in one unit.

12 Claims, 2 Drawing Sheets

(51) Int. Cl.
  *B32B 37/00* (2006.01)
  *B32B 37/06* (2006.01)
  *B32B 41/00* (2006.01)

(52) U.S. Cl.
  CPC .......... *B32B 37/06* (2013.01); *B32B 37/1018* (2013.01); *B32B 41/00* (2013.01); *B32B 2457/12* (2013.01)

(56) References Cited

FOREIGN PATENT DOCUMENTS

| | | | |
|---|---|---|---|
| DE | 102015115453 | A1 | 3/2017 |
| EP | 1894717 | A1 | 3/2008 |
| EP | 1997614 | A2 | 12/2008 |
| EP | 2457728 | A1 | 5/2012 |
| WO | WO 87/01651 | * 9/1985 | ............ B29C 67/18 |
| WO | 1994029106 | A1 | 12/1994 |
| WO | 2010143117 | A2 | 12/2010 |
| WO | 2011089473 | A2 | 7/2011 |
| WO | 2011158147 | A1 | 12/2011 |
| WO | 2013010531 | A2 | 1/2013 |
| WO | 2017098465 | A1 | 6/2017 |

\* cited by examiner

LAMINATING DEVICE AND METHOD FOR LAMINATING AT LEAST ONE LAYER STACK

CROSS REFERENCE TO RELATED APPLICATIONS

The present application refers to and claims the priority of the German patent application 10 2018 101 470.8, filed on 23 Jan. 2018, the disclosure content of which is herein incorporated by reference in its entirety.

FIELD OF THE INVENTION

The present invention relates to a laminating device for laminating at least one layer stack by means of pressure and/or heat in accordance with the features of claim 1 as well as to an associated method in accordance with the features of claim 10.

PRIOR ART

As part of a press, a laminating device of this type comprises a lower part and an upper part which is connectable in gas-tight manner to the lower part in order to form an openable and closable, gas-tight working chamber for receiving the layer stack that is to be laminated. A pressing element that is optionally heatable and which may be in the form of a movable hot plate is then arranged within the working chamber in order to impose on the layer stack the load that is necessary for the laminating process on the one hand and, if necessary, to feed in the heat required for hardening an adhesive layer on the other hand. In addition, the lower part of the laminating device is usually heatable.

Such a laminating device is preferably used for laminating photovoltaic modules under pressure and/or heat, but basically, it is concerned with laminating substantially plate-like workpieces having at least one layer of adhesive such as e.g. PVB which is capable of being activated and/or melted and/or hardened using pressure and/or heat, i.e. as a rule, the layer stack comprises at least one plate-like workpiece as well as an adhesive layer which are laminated as necessary with at least one further layer. The preferred fields of application thereby are the production of glass laminates such as smart glass, laminated glass, laminated safety glass, of photovoltaic modules in the glass-foil domain as well as photovoltaic modules in the glass-glass domain, i.e. thin layer and organic modules, as well as the glass-cell-glass domain (crystalline cells). In particular, smart glass is to be understood herein as relating to those technical glasses in which an effect such as e.g. a darkening of a glass surface can be initiated by the application of a voltage to a layer of the laminate.

A photovoltaic module, which will now be described as an example, usually consists of a solar cell layer which is formed from a plurality of solar cells and their interconnections which are arranged such as to be mutually adjacent between a glass plate and a weatherproof foil or between two glass plates. The individual layers of a photovoltaic module can be laminated with one another under the effect of pressure and/or heat using at least one, but usually however, a plurality of layers consisting of a heat-activatable adhesive material which are arranged in the layer stack between the solar cell layer and the glass plate and/or the weatherproof foil. As a result, the solar cells and their electrical interconnections are encapsulated in a transparent layer composite in damp-proofed as well as weatherproofed manner after the process of hardening and/or curing the adhesive layer. A similar approach is however also applicable for the other glass laminates referred to hereinabove in which different layers are connected or laminated together for different purposes.

In the state of the art, such laminating devices are usually hydraulic presses, which comprise a lower half and an upper press half that are movable relative to each other in order to open and close the press. In the closed state, there is provided between the press halves a working chamber that is closable in gas-tight manner by means of appropriate seals within which workpieces in the form of one or more layer stacks are laminated. Now in order to laminate a workpiece or a plurality of workpieces or one or more layer stacks at the same time—for the sake of simplicity, only one workpiece or one layer stack will be mentioned in the following—this is inserted into the product space of the working chamber and the working chamber is closed. Normally at this point, at least the product space is then evacuated. At the latest when the product space of the working chamber has been evacuated down to a target pressure, which as a rule is usually below 1 mbar, a pressure chamber located thereabove is ventilated so that, due to the difference in pressure between the pressure chamber and the product space, a load acts on the workpiece. By regulating the pressure in the pressure chamber, a desired contact pressure is established whereby in addition thereto, the pressure chamber can be subjected to pressure, i.e. compressed air can also be introduced for example.

Insofar as mention is made of pressure in the context of this application and insofar as something else is not expressly indicated, then it thereby relates to a pressure which, starting from atmospheric pressure, can go in the direction of under pressure down to vacuum on the one hand but also to an over pressure lying above atmospheric pressure on the other hand.

From DE 33 00 622 A1 which forms the basis for the first part of the independent Claims, there is known a laminating device with two pressure chambers separated by a membrane that are operable when needed. There, a movable pressure plate is pressed mechanically downward. Thereby, a first upper pressure chamber is also subjected to compressed air but only in order to increase the pressure on the foil, after the pressure plate is already down. The application of pressure to the first upper pressure chamber thus does not serve to press the pressure plate downwardly.

From DE 10 2015 115 453 A1, there is known a laminating device that consists substantially of a cassette which comprises at least the lower part, the upper part as well as a press element and a means for bringing in process heat. A pressing operation is carried out in this cassette for laminating purposes. A moveable hot plate or a membrane or else a combination of a moveable hot plate and a membrane are provided in the cassette. The lower part and/or the upper part themselves can be heated up in order to introduce process heat thereby. However, a device of this type presupposes a certain number of cassettes of this type for the production of the workpieces.

The employment of a membrane in the form of a flexible gas-tight element divides the working chamber into an evacuatable product space that is provided for receiving at least one workpiece, and an evacuatable and/or pressurisable pressure space. Due to a difference of pressure produced by differing pressures in the product space and the pressure area, the membrane can be pressed against the workpiece whereby it presses the workpiece against a lower surface of the working chamber and thereby applies the load to the workpiece that is needed for the laminating process. The contact pressure on the membrane can be set by regulating the difference of pressure.

Membrane presses of this type are also known from EP 2 457 728 A1 or from EP 1 894 717 A1 for example. Hereby, in the case of EP 1 894 717 A1, a multi-step laminating method is carried out in that the vacuum pressing chamber is first evacuated and only afterwards is the workpiece hot pressed. This is achieved in that the lower part is adapted to be lifted relative to the lower pressing table so that a workpiece located in the press does not initially come into contact with the heated pressing plate when the working chamber is closed. The lower part is to that extent mounted on the lower pressing table in floating manner.

From WO 2017/098465 A1, there is known a membrane-less laminating device which is provided with a thermal cover. Therein, a moveable, heatable pressure plate for membrane-less laminating of photovoltaic modules is provided with a kind of cushion or pad which is loosely attached to the lower surface of the moveable pressure plate and is able to transfer heat to a workpiece. A compensatory effect is intended to be achieved by the thermal cover, it thus relates to a pad or a cushion. In the case of membrane-less laminating devices of this type, pressure and heat are introduced into the workpieces by the flat press itself.

A membrane-free laminating device is also known from WO 2013/010531 A2 for example, wherein there is provided a peripheral inflatable seal on a pressing plate. The laminating pressure can be affected by altering the pressure in the inflatable seal.

In order to increase the throughput of the laminating device, it is proposed in EP 1 997 614 A2 that the cycle time be shortened when laminating by dividing up the actual laminating process into a plurality of steps which are carried out in a respective plurality of presses that are arranged one behind the other.

From WO 2010/143117 A2, there is known a laminating device and a laminating method with more than one separable pressure chamber in which a multiplicity of layers or a layer stack can be laminated. Comparable solutions are known from DE 29 19 285 A1, WO 2011/158147 A1 and WO 94/29106 A1)

Basically, apart from the allocation into membrane-free and membrane-using laminating processes, the laminating processes can also be divided into single and multi-stage processes. In the case of a single-stage laminating process, vacuum, pressure and tempering the workpiece are effected successively in one unit. In the case of a multi-stage process however, pressure, vacuum and tempering are possible in a first stage, whilst pressure and tempering without vacuum are employed in at least one further stage. Thus, the individual process steps are separated in order to increase the output of the machine. The output cycle is halved, the output itself doubles.

From a technical processing point of view, the known solutions come at the end of the possibilities for shortening the cycle time. If, for the purposes of overcoming this problem, multi-stage solutions are employed, more space is necessary and significantly higher capital outlays result as well as a greater power consumption.

In addition, the introduction of heat into the workpiece is usually effected on one side only, from below. Consequently, internal stresses can occur in the workpiece or may be introduced permanently, thereby reducing the long-term stability of the workpieces and increasing the rejection rate. Hereby, significantly less heat is introduced into the product due to the heat being introduced into the workpiece from only one side in comparison with a system where the introduction of heat occurs at both sides. In addition, and in dependence on the product, disadvantages in regard to the quality of the product can ensue due to the transfer process in multi-stage solutions since an undefined state is present when transferring between the individual stages.

As a further problem, it has turned out in practice that, at present, different photovoltaic modules are not, or only to a limited extent, producible in one press, i.e. different modes of operation are not possible or only after appropriate changes. Thus, for the production of glass-foil modules, membranes are usually needed, as otherwise the strings in the modules "float". In contrast thereto, flat presses, i.e. without membrane are generally used for the production of glass-glass modules. There again, in the case of the production of glass-cell-glass modules, "floating" of the cells in the form of offset cells in the module can occur due to a minimal parallelism-difference of the two hot plates relative to each other.

DISCLOSURE OF THE INVENTION

On the basis of this prior art, the object of the present invention is to implement different modes of operation of a laminating device in one unit.

This is achieved with a laminating device as well as with a method of laminating at least one layer stack in accordance with the features of claims 1 and 10 respectively. Advantageous developments form the subject matter of the dependant claims. The features specified separately in the claims are combinable with one another in a technologically meaningful way and can be supplemented by matters derived from the description and by details from the Figures wherein further exemplary variants of the invention are depicted.

If thereby, in the context of the invention, mention is made of a flexible gas-tight element, then it may also relate thereby to a material for this flexible element that is only approximately or substantially gas-tight. This applies in particular for the flexible element separating off the upper pressure chamber. If a silicone membrane, which as a rule is gas-tight, is not used therefor, but rather, a fabric cloth coated with FKM is used instead, leakage can result which however is uncritical from a technical point of view.

For the purposes of laminating at least one layer stack which comprises at least one substantially plate-like workpiece and at least one layer that also acts as an adhesive layer by means of pressure and/or heat in order to form, in particular, a glass laminate and/or photovoltaic module, the laminating device comprises a lower part and an upper part that is connectable to the lower part in gas-tight manner. An openable and closable working chamber for receiving the layer stack during the laminating process is formed between the lower part and the upper part. A movable pressure plate which is heatable as necessary or else which can be heated is movable along a pressing axis within the working chamber between the upper part and the lower part. A plurality of pressure chambers that are separable from each other and operable if necessary are provided in the working chamber. In addition, a sealing frame is arranged between the lower part and the upper part. A plurality of mutually spaced clamping positions are provided in the direction of the pressing axis, whereby at least one flexible element that is preferably in the form of a membrane is fixed or is fixable at one of the clamping positions for separating a first pressure chamber, from which, by the application or non-application of pressure or negative pressure, the movable pressure plate is movable in the working chamber. The flexible gas-tight element divides the working chamber into a first pressure chamber that is located above the flexible gas-tight element and a second pressure chamber that is located below the flexible gas-tight element and in which the movable pressure plate is arranged, whereby the movement of the movable pressure plate is effected due to a difference of pressure between the pressure chambers.

The constructional prerequisites are thus created for employing the device in membrane-free manner and also for introducing heat into the process from the movable pressure plate if this is configured to be heatable. The movable pressure plate can be moved independently of the press and other elements of the laminating device and independently of a membrane that is additionally employable should this be necessary so that suitably controlled or regulated pressure and heat can be introduced into the process. There thus results a combination of a flat press stage and a membrane stage in one unit. Different modes of operation in one unit are thereby possible, i.e. the laminating device can be operated as a flat press, a membrane press or a flat and membrane press.

Overall, a construction of this type leads to a better utilization of resources since, firstly, the space required for the entire plant can be reduced due to a shortening of the plant because only one press stage is necessary. At the same time, the processes can be carried out more quickly since all the processes can be can be carried out in one unit. This in turn contributes to a shortening of the cycle time, a smaller power consumption and a higher quality of the workpieces. In particular, the long-term stability is improved since repositioning of the workpieces is no longer necessary.

In the case of glass-foil photovoltaic modules, the contraction of the rear sheet will be eliminated since, in the event of the utilisation of a heatable, movable pressure plate, both sides can be subjected to heat. In contrast to a single-stage implementation, the introduction of heat from both sides can then be realized through the movable pressure plate and from the lower part, something which, in particular, is of significance in the case of glass-glass applications. In the case of the mode of operation in the form of a flat press, excessive edge compressions at the edge of workpiece do not arise so that fewer stresses are set up in the workpiece.

In principle, it is thereby possible to manufacture the most diverse types of glass laminates in one plant i.e. the production of glass-foil, glass-glass, glass-cell-glass modules in one plant is possible. In principle thereby, defined process parameters and processing conditions will always result during the entire production cycle. This leads to a cost saving in contrast to multi-stage implementations. The cycle time of a multi-stage implementation can be achieved with just the building area of a single-step implementation.

At the same time, the device is not only suitable for the production of all known types of photovoltaic modules, but also for the production of glass laminates of all types (such as e.g. smart glass too) so that flexible uses in the most different kinds of application result. We are thus concerned with a single-step process in which, by adding one further flat press as necessary, the cycle time can again be shortened. At the same time, there is a combination of a flat and a vacuum membrane press. A plurality of modes of operation become possible, i.e. a membrane press under vacuum and pressure, a flat press under pressure, combined laminating under pressure/vacuum. Purposeful influencing and controlling of the necessary processes thus become possible.

The laminating device preferably comprises at least one intermediate frame that is provided in the form of a sealing frame that is separate from the lower part and the upper part, whereby the clamping positions can be provided on or between these elements. It is thereby possible to provide between the intermediate frame and the upper part or between the intermediate frame and the lower part either yet another frame or at least however to use the existing intermediary spaces or gaps in order to insert therein—dependent entirely on the need—flexible gas-tight elements serving e.g. as membranes or as pressure chamber delimiters. However, clamping positions could also be formed on these elements. Depending upon the number of frames, it is thereby possible to create a multi-pressure-chamber system, which however can be reduced down to two chambers, namely, a first pressure chamber and a product space depending upon the intended purpose.

Expediently, a first flexible gas-tight element is clamped in a gap above the intermediate frame and a further flexible element in the form of a membrane is clampable into a gap below the intermediate frame. This means that the membrane does not have to be provided continuously, but a three-chamber system can be converted to a two chamber system in the form of a flat press in a vacuum chamber in problem-free manner by removal of the membrane.

If a further flexible gas-tight element serving as a membrane is clamped in place, the working chamber is preferably divided by the membrane into a second pressure chamber in which the movable pressure plate is provided that is located above the membrane and a product space that is likewise subjectable to pressure or negative pressure should this be necessary which is located below the membrane plate. It is thereby possible on the one hand to operate the laminating device as a membrane press although at the same time however, as the membrane is removable, the device can equally be operated as a flat press. As a result, there is a three-chamber system with a first pressure chamber, a second pressure chamber and the product space, whereby, with the removal of the membrane, the separation of the first pressure chamber from the product space remains. The separation of the second pressure chamber by the membrane then leads to the three-chamber system which permits of the most different kinds of use of the laminating device. Preferably thereby, the reciprocating action or the movement of the movable pressure plate is effected by the differences of pressure within the individual chambers. In principle however, more than three chambers could also be provided.

Hereby, the three-chamber system is ensured in that at least three pressure chambers that are separated from each other by two flexible gas-tight elements namely, the membrane and the first flexible gas-tight element are defined between the lower part and the upper part, i.e. the first and second pressure chamber and the product space.

It is of advantage if the movable pressure plate and the membrane are movable independently of one another from the pressure chambers for contact or non-contact with the lower part or layer stack. Consequently, the membrane and the movable pressure plate can also impose the pressure on the workpiece that is to be laminated independently of one another.

Expediently, the sealing frame arranged between the lower part and the upper part is formed of multiple parts and comprises a membrane frame at the level of the membrane, an intermediate frame at the level of the second pressure chamber and an upper chamber frame at the level of the first pressure chamber. The flexible gas-tight elements can be clamped as desired in order to delimit the pressure chambers from each other due to the multi-part nature of the sealing frame and the gaps provided thereby between the frames.

This increases the modularity and the desired flexibility of the possible ways of employment.

Advantageously, the movable pressure plate is mounted in weight-compensated manner on the upper part by means of at least one preferably resilient restoring means e.g. a spring column and is thus biased against the upper press table. From this weight-compensated disposition, the movement of the movable pressure plate can be controlled in an energy-efficient manner by differences of pressure in the pressure chambers.

The object is also achieved by a method of laminating at least one layer stack, wherein the at least one layer stack is inserted into an openable and closable working chamber which is formed between the lower part and the upper part of the laminating device and which, in the closed state when laminating, is closable in gas-tight manner by means of a sealing frame that is arranged between the lower part and the upper part. The movable pressure plate is movable as necessary within the working chamber between the upper part and the lower part or layer stack along the pressing axis of the laminating device. The movement of the elements of the laminating device arranged in the working chamber is effected from operable pressure chambers that are provided in the working chamber by subjecting or not subjecting them to pressure or negative pressure, i.e. as a result if necessary, by the difference of pressure existing between these pressure chambers and the product space as well. The movable pressure plate is moved from a first pressure chamber which is separated from the working chamber by a flexible gas-tight element that is arranged transverse to the pressing axis and which is fixed or is fixable to one of a plurality of mutually spaced clamping positions along the pressing axis by the application or non-application thereto of pressure in the working chamber. The working chamber is divided by the flexible gas-tight element, namely in particular, by the first flexible gas-tight element into a first pressure chamber that is located above the flexible gas-tight element and a second pressure chamber in which the movable pressure plate is movable that is located below the flexible gas-tight of element, whereby the movement of the pressure plate is effected due to a difference of pressure between the pressure chambers. By virtue of this arrangement, it is possible to control the movable pressure plate separately. Consequently, the constructional prerequisites are also created for additionally converting the laminating device into a membrane press and thus of operating the laminating device in operation as a flat press, a membrane press or as combination of a flat and a membrane press or a membrane and a flat press.

It is of advantage, if a first gas-tight element is clamped into a gap above an intermediate frame forming a part of the sealing frame and if a further flexible element serving as a membrane is clampable into a gap below this intermediate frame. A first pressure chamber which permits the actuation of the movable pressure plate is created by the clamped first flexible gas-tight element. In addition, due to the membrane, uncoupling of the movable pressure plate and the membrane can be effected once more so that these can, in principle, be operated independently of each other.

Preferably, the working chamber is divided by the flexible gas-tight element, namely in particular, by the first flexible gas-tight element into a first pressure chamber that is located above the flexible gas-tight element and a second pressure chamber in which the movable pressure plate is moved and which is located below the flexible gas-tight element. At the same time, this second pressure chamber may already also be serving as the product space, in particular, if a separate membrane is not used. Due to the separation of the first pressure chamber from the "movement space" for the movable pressure plate, independent operation and actuation of the movable pressure plate are in principle made possible independently of the other parts in the work space.

Expediently, when a membrane serving as a further flexible element is clamped in position, the membrane is then clamped in such a way that it divides the working chamber into a second pressure chamber in which the movable pressure plate is moved that is located above the membrane and a product space that can likewise be subjected to pressure should this be necessary and which is located below the membrane. There is thus created a three-chamber system, from which in particular the movable pressure plate and the membrane can be operated independently of each other and also together if so desired. This permits a versatile range of application for the device, entirely as required and suited precisely to the particular purpose or the laminate that is to be produced.

Advantageously, the method comprises the steps
introducing a layer stack into the working chamber,
simultaneously evacuating the first pressure chamber, the second pressure chamber and the product space,
ventilating the first pressure chamber, whereby the movable pressure plate together with the membrane is applied to the layer stack,
building up pressure on the layer stack,
ventilating the pressure chambers and the product space for the removal of the laminated layer stack.

In the case of an operation of this type, the device can be operated as a flat press with a membrane, wherein the moveable pressure plate together with the membrane is applied to the underlying workpiece. In addition, a pressure above the ambient atmospheric pressure i.e. a positive pressure can be applied as necessary in order to further increase the pressure in the first pressure chamber should this be necessary.

Likewise, it is of advantage in the case where a membrane is not present if the method comprises the steps:
introducing a layer stack into the working chamber,
evacuating the first pressure chamber as well as the product space,
ventilating the first pressure chamber and placement of the movable pressure plate on the layer stack,
building up pressure on the layer stack,
ventilating the product space and removal of the laminated layer stack.

In the case of this mode of operation, we are concerned with a flat press without a membrane, i.e. a membrane-less method but one which can be implemented in the same device. Herein, only the movable pressure plate is placed on the workpiece and here too, as before, a pressure above the atmospheric pressure can also be applied to the first pressure chamber.

In accordance with a further mode of operation, the method expediently comprises, the steps:
introducing a layer stack into the working chamber,
evacuating the first pressure chamber, the second pressure chamber and the product space,
ventilating the second pressure chamber and placement of the membrane, without the movable pressure plate coming into contact with the membrane,
ventilating the first pressure chamber and the product space and removal of the laminated layer stack.

This mode of operation is known as a membrane press and this method can also be operated with the same device. Here, the second pressure chamber comes to the fore since, by ventilation of this chamber, the membrane is placed on the workpiece without a movable pressure plate. In this case, a positive pressure above atmospheric pressure can additionally be produced in the second pressure chamber.

Advantageously, a further mode of operation can also be employed, one which is to be regarded as a combination of a membrane and a flat press. A method of this type comprises the steps:

introducing a layer stack into the working chamber,
evacuating the first pressure chamber, the second pressure chamber and the product space,
ventilating the second pressure chamber and placing the membrane on the layer stack,
ventilating the first pressure chamber and placing the movable pressure plate on the membrane and the underlying layer stack whereby the pressure in the first pressure chamber is greater than the pressure in the second pressure chamber,
ventilating the pressure chambers and the product space for the removal of the laminated layer stack.

Initially thereby, the membrane is placed on the workpiece by the process of ventilating the second pressure chamber, whereby a positive pressure above atmospheric pressure can be applied to the second pressure chamber should this be necessary. Meanwhile, the movable pressure plate remains above the membrane and does not make contact with the product. However, if the first pressure chamber is then ventilated, the movable pressure plate sinks onto the membrane and the underlying workpiece. For this purpose however, the pressure in the first pressure chamber must be higher than it is in the second pressure chamber. All this can likewise be effected with the same device.

Expediently, as a further mode of operation, an operation in the form of a flat and a membrane press in combination is possible. The method comprises hereby the steps introducing a layer stack into the working chamber,
evacuating the first pressure chamber, the second pressure chamber and the product space,
ventilating the first pressure chamber and placing the movable pressure plate and the membrane together on the layer stack,
ventilating the second pressure chamber and moving the movable pressure plate away from the membrane,
as necessary, sinking the movable pressure plate onto the layer stack and the membrane at least one further time and subsequently raising the movable pressure plate,
ventilating the pressure chambers and the product space for the removal of the layer stack.

Initially hereby, the movable pressure plate and the membrane are placed on the workpiece together, whereby at first only the surface pressure of the movable pressure plate derived from the resulting difference of pressure from the process vacuum in the product space and the ventilation pressure is effective in the first pressure chamber. Hereby, the membrane itself does not as yet participate since the second pressure chamber is still evacuated so that the membrane is initially only effective as a pad. However if the second pressure chamber is subsequently ventilated, the membrane pressing process is effected with the membrane pressure. In the case of a ventilated second pressure chamber and when using a weight compensation process e.g. by means of the spring column, the movable pressure plate will again be urged upwardly, or can be applied to the membrane with the help of a slight positive pressure whilst overcoming the restoring force of the spring column and thus introduce temperature into the workpiece. This can also be effected successively a plurality of times. By means of an increase of the positive pressure in the first pressure chamber, a pressure can additionally be applied as in the case of a flat press process.

A further mode of operation has turned out to be a method which is suitable in particular for application for the purposes of laminating smart glass or glass laminates e.g. with PVB or other adhesive films. The method comprises thereby the steps introducing a layer stack into the working chamber,
applying a pressure which is greater than atmospheric pressure to the first pressure chamber,
placing the movable pressure plate and, if present, the membrane on the layer stack,
introducing heat and in particular the same amount of heat from the movable pressure plate and from the lower part into the layer stack,
lowering the pressure in the first pressure chamber and lifting the movable pressure plate,
operating the device as a flat and/or membrane press,
removing the laminated layer stack.

Other than was the case in the preceding methods, in this application one does not start with vacuum at least in the first pressure chamber 18, but with pressure. The product space 20 can but does not have to be evacuated for this purpose. At the same time a uniform amount of heat can be introduced into the adhesive layer and/or the liquid crystal layer, something which will increase both quality and yield rate.

It is thus clear that, in principle, six different modes of operation are thereby possible in one and the same device. In addition, it is in principle possible to build up a pressure which is higher than atmospheric pressure in the first pressure chamber and/or the second pressure depending upon need, something which will increase the possibilities of use still further.

Expediently, apart from the five [sic] aforementioned modes of operation, the possibility arises for each mode of operation of not lowering the pressure in the product space itself and in particular not lowering it under atmospheric pressure so that yet further increases in the possibilities of use are thereby created.

Further advantages are apparent from the dependent claims and the following description of preferred exemplary embodiments.

BRIEF DESCRIPTION OF THE FIGURES

In the following, the invention is described in more detail on the basis of exemplary embodiments that are illustrated in the accompanying Figures. Therein.

DETAILED DESCRIPTION OF PREFERRED EXEMPLARY EMBODIMENTS

The invention will now be described exemplarily in more detail with reference to the accompanying drawings. Nevertheless, in the case of the exemplary embodiments, they relate only to examples which are not intended to restrict the inventive concept to a particular arrangement. Before the invention is described in detail, it should be pointed out that it is not restricted to the particular components of the device and the particular process steps, since these components and methods can vary. The terms used here are only intended to describe special embodiments and are not used restrictively. If, in addition, the singular or indefinite articles are used in the description or in the Claims, this refers also to a plurality of these elements insofar as the general context does not make something else unambiguously clear.

Figure 1:
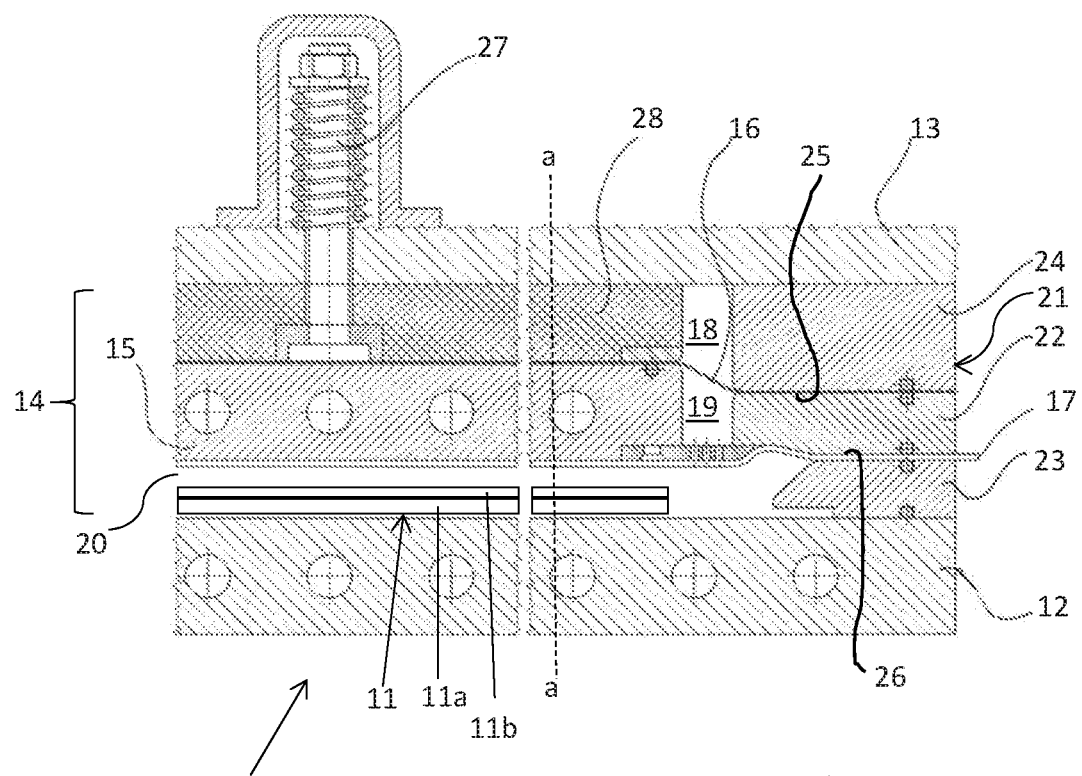
FIG. 1 shows a schematic section through the work space of a laminating device including spring columns in the case of a raised pressing plate with a workpiece in the work space, FIG. 2 a section through the laminating device in accordance with the right-hand part of FIG. 1 in the case of the mode of operation: membrane pressing, FIG. 3 an illustration in accordance with FIG. 2 in the case of the mode of operation: flat and membrane pressing, FIGS. 4, 5 an illustration in accordance with FIG. 2 in the case of the mode of operation: flat pressing without membrane with raised and lowered pressure plate.

The Figures show a section through a laminating device 10 for laminating at least one layer stack 11 which, in accordance with FIG. 1, comprises at least one substantially plate-like workpiece 11a and at least one adhesive layer 11b. Thereby, an adhesive layer is also to be understood as a layer which, apart from the adhesive effect, also has yet other effects as can be the case with e.g. technical glasses such as smart glass.

The laminating process is effected with pressure and/or heat whereby, in particular, a glass laminate and/or a photovoltaic module is manufactured by the laminating process. The device illustrated in the Figures is a flat press and/or a membrane press or a laminator for pressing laminates of this type, whereby in the Figures, only a schematic section through the work space 14 of the device is illustrated. Supplementing this as shown in FIG. 1 is a spring column 27 which preferably serves as a resilient restoring means by means of which the movable working plate 15 is biased against the upper part 13 of the press. This spring column 27 serves for compensating for the weight of the movable pressure plate 15. Basically however, other components for weight compensation purposes are also known to the skilled person, such as e.g. hydraulic, pneumatic or mechanical restoring means. All of the other parts which are known to the skilled person particularly in the field of the production of presses and which have no significance for the invention have been omitted. In addition, only the right-hand part of the work space 14 is illustrated in the Figures, but it is self-evident that the work space 14 extends further to the left in the Figures and there exhibits a corresponding mirror-imaged construction.

The preferred usage of the laminating device is—although without any restriction thereto—for the production of glass laminates, such as smart glass, compound glass or laminated safety glass, photovoltaic modules in the glass-foil domain as well as photovoltaic modules in the glass-glass domain (thin layer and organic modules) and glass-cell-glass domain (crystalline cells). Herein, smart glass is to be understood as meaning technical glasses in which e.g. an effect can be initiated such as e.g. a darkening of a surface by the application of a voltage to a layer of the laminate.

In principle however, different materials are also just as possible as other fields of application for the laminating process.

In principle, a plurality of plate-like workpieces can also be worked on in the work space and it is likewise possible for additional layers and/or workpieces to be laminated together one above the other in the work space.

In the following, the basic construction of the laminating device will be described with the aid of FIG. 1. The laminating device comprises a lower part 12 and an upper part 13 which is connectable to the lower part 12 in gas-tight manner, these being illustrated in the exemplary embodiment by the corresponding parts of the press or the press table. Between these parts of the press, i.e. between the lower part 12 and the upper part 13, there is provided an openable and closable working chamber 14 for receiving the layer stack 11 in the course of the laminating process. Further components are also arranged in the work space 14, such as in particular, the movable pressure plate 15 or, if necessary, the isolating layer 28 for isolating purposes with respect to the upper part 13. It is apparent from FIG. 1 that the mounting of the movable pressure plate extends through the isolating layer 28 and the upper part 13 so that the mounting can be effected there on the spring column 27 in the form of a resilient restoring means.

The movable pressure plate 15 is movable within the working chamber 14 between the upper part 13 and the lower part 12 or the layer stack 11 along a pressing axis a-a. The pressure plate 15 can be heated or be heatable but does not have to be. Herein, the pressing axis defines the closing and opening direction of the press. In addition, in FIG. 1, a sealing frame 21, which is formed of multiple parts according to the invention, is arranged on the right-hand side, between the lower part 12 and the upper part 13. In the working chamber 14 furthermore, there are provided a plurality of mutually separable, pressure chambers that are subjectable if so required to pressure or negative pressure.

At least one flexible element, namely, either the first flexible element 16 and/or the further flexible gas-tight element 17 in the exemplary embodiment is fixed or clamped or is fixable or clampable between the parts of the multi-part sealing frame 21 for the purposes of separating off a first pressure chamber 18, whereby the movable pressure plate 15 is movable by subjecting or not subjecting this first pressure chamber 18 to pressure or negative pressure. At least one intermediate frame 22 is provided as a sealing frame separate from the lower part 12 and the upper part 13. At least one gap 25, 26 is provided between the intermediate frame and the lower part 12 or the upper part 13. Hereby, a first flexible gas-tight element 16 is clamped into the gap 25 above the intermediate frame 22. A further flexible element in the form of a membrane that can be used for membrane presses is clampable in the gap 26 below the intermediate frame 22. Clampable here means that the membrane 17 does not have to be clamped, but operation without a membrane 17 is also possible, something which will be gone into in greater detail further below. In any case, the device is prepared for the clamping of the membrane 17 should this be necessary.

If mention is made herein of a flexible gas-tight element, then it may also relate thereby to a material for this flexible element that is only approximately or substantially gas-tight. This applies in particular for the flexible element 16 separating off the upper pressure chamber. If a silicone membrane which, as a rule, is gas-tight is not used for that element, but a fabric cloth coated with FKM is used instead, a leakage can result but this however is not critical for the technical process. As a rule, the further flexible element, the membrane 17, can be formed such as to be gas-tight.

The at least one flexible gas-tight element thus divides the working chamber into different regions. In the exemplary embodiment, the first flexible gas-tight element divides the working chamber 14 into a first pressure chamber 18 that is located above this element and a second pressure chamber 19 in which the movable pressure plate 15 is provided that is located below this element. Consequently, the first pressure chamber 18 is separated from a movement space for the movable pressure plate 15. If, in addition, a further flexible gas-tight element serving as a membrane 17 is clamped in place, this membrane 17 divides the working chamber 14 into a second pressure chamber 19 (see above), located above the membrane 17 in which the movable pressure plate 15 is provided with its movement space, and a product space 20 located below the membrane 17 in which the layer stack 11 or the workpiece is accommodated. If necessary, the product space 20 can also be subjected to pressure or negative pressure.

If, in the following, mention is made of a layer stack or a workpiece, then it should be understood that this is to be understood as meaning more than workpiece or more than one layer stack 11.

In the exemplary embodiment of FIG. 1, there are provided between the lower part 12 and the upper part 13 at least three pressure chambers which are separated from each other by two flexible gas-tight elements namely, the first pressure chamber 18, the second pressure chamber 19 and the product space 20.

Advantageously, the movable pressure plate 15 and the membrane 17 are movable independently of each other from the pressure chambers for contact or non-contact with the lower part 12 or the layer stack 11. Consequently, the most diverse modes of operation can be realised using one and the same laminating device.

A membrane frame 23 at the level of the membrane 17, an intermediate frame 22 at the level of the second pressure chamber 19 and an upper chamber frame 24 at the level of the first pressure chamber 18 are provided as parts of the sealing frame 21 between the lower part 12 and the upper part 13.

A construction of this type permits a rapid rebuild, especially if the membrane 17 is used or else is not used as necessary.

In accordance with FIG. 1, the movable pressure plate 15 is mounted in weight-compensated manner on the upper part 13 by means of the spring column 27, which upper part is also the upper part of a press at the same time. In principle however, other restoring means that are known to the skilled person are conceivable for the purposes of weight compensation, such as in particular, hydraulic or pneumatic or else mechanical components. An inverted construction in which the lower part is movable, or a construction in which the lower part and the upper part are movable is in principle just as conceivable.

In accordance with the method, at least one layer stack 11 can be laminated with the device. A layer stack 11 of this type preferably comprises at least one substantially plate-like workpiece 11a and at least one adhesive layer 11b. In principle, further layers and further workpieces that are located next to each other or located one above the other are also accommodatable in the work space. Laminating is effected by means of pressure and/or heat to which end pressure can to be applied by means of the movable pressure plate 15 or the press and/or heat can be conveyed into the working chamber 14 and thus into the workpiece by the movable pressure plate that is heatable if necessary or via the lower part 12 in order to e.g. activate or harden an adhesive layer.

When laminating, at least one layer stack 11 is introduced into an openable and closable working chamber 14 which is formed between the lower part 12 and the upper part 13 of the laminating device 10. In the closed state when laminating, this working chamber 14 is closable in gas-tight manner by means of a sealing frame 21 that is arranged between the lower part 12 and the upper part 13. The movable pressure plate 15 is movable as necessary within the working chamber 14 between the upper part 13 and the lower part 12 or the layer stack 11 along a pressing axis a-a of the laminating device.

The movement of the elements of the laminating device arranged in the working chamber 14 and in particular the movable pressure plate 15 is effected from operable pressure chambers that are provided in the working chamber 14 by subjecting them or not subjecting them to pressure or negative pressure. Thereby, the movement of the movable pressure plate 15 is effected in particular due to a difference of pressure between the pressure chambers, i.e. in the exemplary embodiment, between the first pressure chamber 18 and/or the second pressure chamber 19 and/or the product space 20.

The movable pressure plate 15 is moved out of the first pressure chamber 18 by the application or non-application thereto of pressure in the working chamber 14. The first pressure chamber 18 is separated from the working chamber 14 by a flexible gas-tight element that is arranged transverse to the pressing axis a-a and is held by the multi-part sealing frame 21 so that the movable pressure plate 15 can be moved at will within the working chamber 14 due to the aforesaid differences of pressure. This movement can be effected together with a membrane 17, independently of a membrane or else without a membrane 17.

Preferably, a plurality of flexible gas-tight elements are provided, whereby, in a first exemplary embodiment, a first flexible gas-tight element 16 is clamped into a gap 25 above an intermediate frame 22 forming a part of the sealing frame 21 in accordance with FIG. 1 and a further flexible element is clampable into a gap 26 below the intermediate frame 22 as the membrane 17 that is required for the membrane press in dependence upon the purpose for which it is employed.

By virtue of the flexible gas-tight element and indeed particularly due to the first flexible gas-tight element 16, the working chamber 14 is divided into a first pressure chamber 18 that is located above the flexible gas-tight element and a second pressure chamber 19 that is located below the flexible gas-tight element in which the movable pressure plate 15 is provided and is also moved therein. This is clearly apparent from the view depicted in FIG. 2 for example.

If a further flexible element in the form of a membrane 17 is clamped in place, then this membrane 17 also sub-divides this working chamber 14. In this case, there results above the membrane 17 a second pressure chamber 19 in which the movable pressure plate is moved and a product space 20 which is located below the membrane 17 and is likewise subjectable to pressure should this be necessary. In accordance with FIG. 1, the product space 20 is intended to accommodate the workpiece or the layer stack 11.

Figure 2:
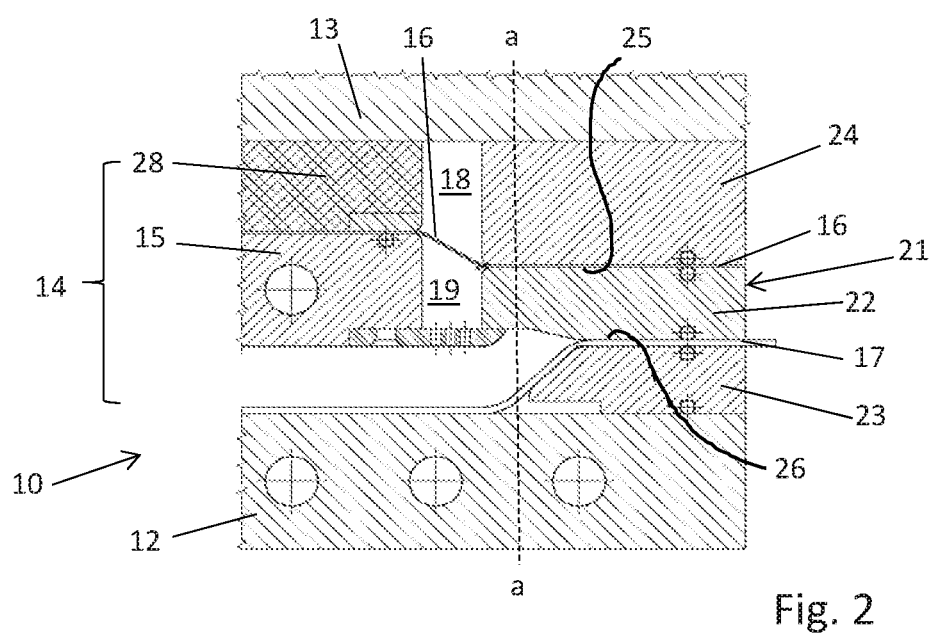
Figure 3:
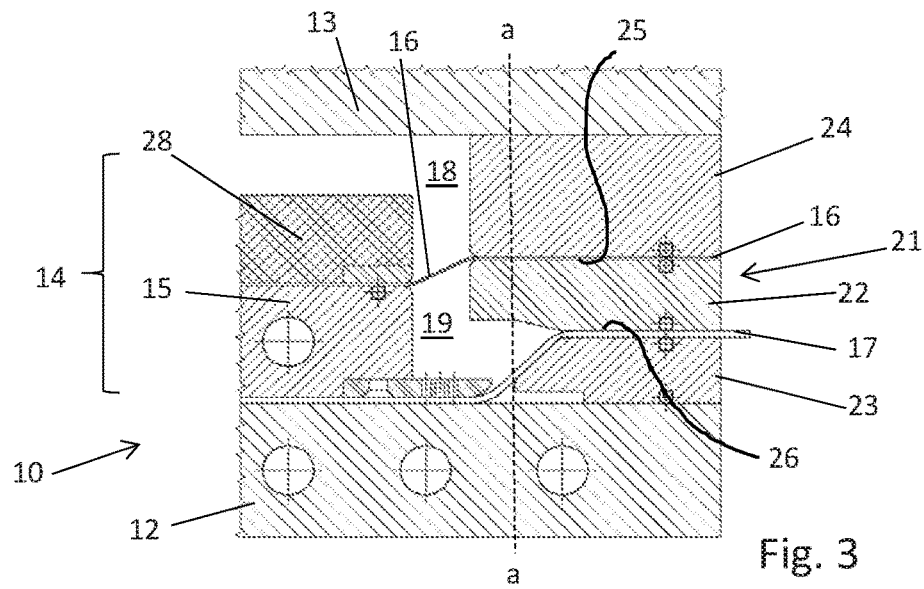

FIG. 2 shows the employment of the laminating device as a flat press with membrane. During the evacuation phase of the product space 20, the pressure chambers 18 and 19 are evacuated at the same time. In this phase, the movable pressure plate remains in its upper position in accordance with FIG. 1. In order to build up the pressure, the first pressure chamber is now ventilated whereby the movable pressure plate 15 together with the membrane 17 is placed on the layer stack in accordance with FIG. 3. The pressure phase on the workpiece now begins. As a supplement thereto, a pressure above atmospheric pressure can additionally be applied to the first pressure chamber. Subsequently, the pressure chambers and the product space 20 are ventilated and the laminated layer stack can be removed from the product space 20.

Figure 4:
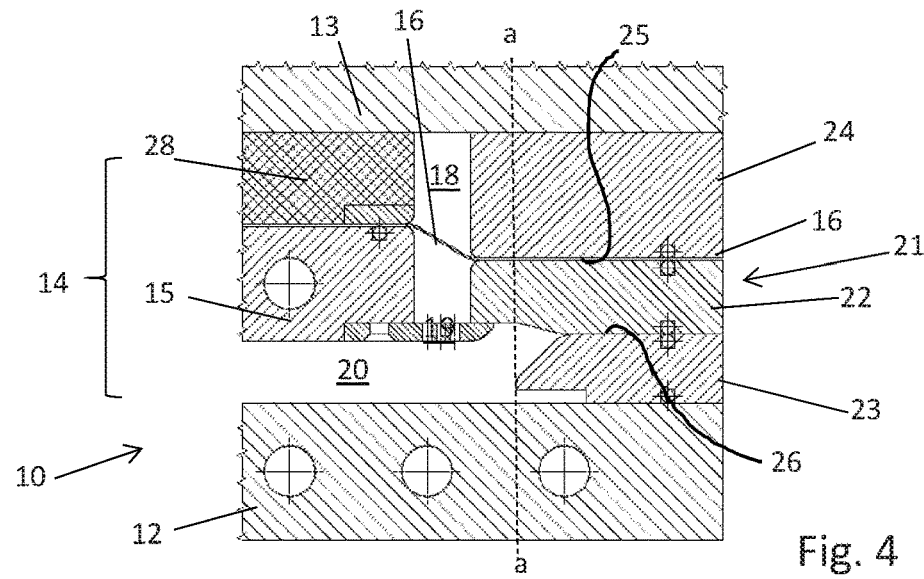
Figure 5:
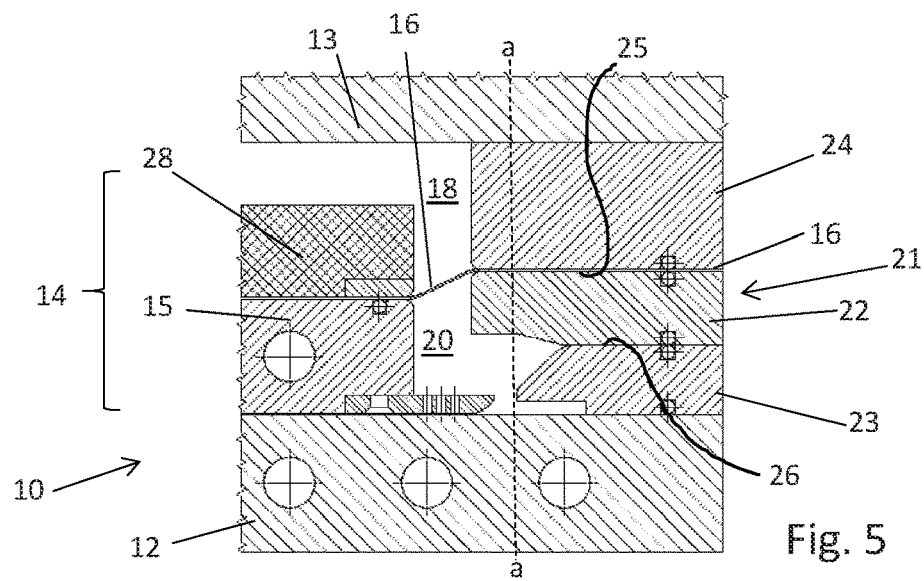

In principle, flat presses without a membrane are also possible. To this end, the membrane 17 must be taken out of the gap 26 between the membrane frame 23 and the intermediate frame 22 so that there results a view in accordance with FIGS. 4, 5. There thus remains only two spaces in the working chamber, viz. the lower chamber which comprises the product space 20 and in which the movable pressure plate 15 is also arranged, as well as the first pressure chamber 18. At the beginning, both pressure chambers are evacuated whereby the movable pressure plate 15 remains in its upper position (FIG. 4). Afterwards, if the first pressure chamber 18 is ventilated, the movable pressure plate 15 sinks down onto the workpiece or the layer stack 11 (FIG. 5). The pressure phase thus begins whereby in principle and should it be necessary, a pressure above atmospheric pressure can be applied to the first pressure chamber 18. Subsequently, the product space 20 is ventilated and the laminated layer stack 11 is removed.

FIG. 2 shows the operational mode: membrane pressing. In this mode of operation, after the layer stack 11 has been inserted into the working chamber 14, the product space 20 but also the first pressure chamber 18 and the second pressure chamber 19 as well are evacuated. Subsequently, the second pressure chamber 19 is now ventilated so that, in accordance with FIG. 2, the membrane without the movable pressure plate 15 sinks down onto the layer stack 11. In this phase, pressure can now be applied, whereby a pressure above atmospheric pressure can additionally be applied to the second pressure chamber 19 should this be necessary.

A further mode of operation is that of membrane and flat pressing in combination. After the layer stack 11 has been inserted into the working chamber 14, the product space 20 as well as the first pressure chamber 18 and the second pressure chamber 19 are evacuated. Subsequently, by ventilating the second pressure chamber 19, the membrane 17 is placed on the layer stack 11. If necessary thereby, a pressure above atmospheric pressure in the form of an over-pressure can be applied to the second pressure chamber 19. The movable pressure plate 15 meanwhile remains in its upper position and does not make contact with the layer stack 11. This corresponds to the illustration in accordance with FIG. 2. Following thereon, the movable pressure plate 15 is placed on the membrane 17 and the underlying layer stack 11 by ventilating the first pressure chamber 18. Thereby, the pressure in the first pressure chamber 18 must be higher than the pressure in the second pressure chamber 19 or the second pressure chamber 19 must be ventilated beforehand in order to enable this procedure to be carried out. In order to prevent an air cushion thereby being formed in the second pressure chamber 19, it is recommended however that the air be removed from the second pressure chamber. This leads to an illustration in accordance with FIG. 3, in which the membrane 17 and also the movable pressure plate 15 are lowered onto the layer stack 11.

As a further mode of operation is the possibility of a flat-press and membrane press in combination. Here too, after the insertion of the layer stack 11, the product space 20 as well as the first pressure chamber 18 and the second pressure chamber 19 are evacuated. Now, by ventilating the first pressure chamber 18, the movable pressure plate 15 and the membrane 17 are laid applied together to the workpiece, something which corresponds to the illustration in accordance with FIG. 3. Now initially in this position, the surface pressure of the movable pressure plate resulting from the difference of pressure between the product space 20 and the ventilation pressure in the first pressure chamber 18 is effective. Hereby, the membrane 17 itself does not yet participate in this action since the second pressure chamber 19 is still evacuated so that at first the membrane 17 only works as a pad. By ventilating the second pressure chamber 19, a membrane pressure can now be eased off as happens with membrane presses. By ventilating the second pressure chamber 18, the movable pressure plate 15 is moved upwardly as a consequence of the spring column 27 serving as a restoring means in accordance with FIG. 1 or it can be placed on the membrane 17 with the help of a slight over-pressure whilst overcoming the restoring forces of the spring column 27. In the case of a heatable pressure plate 15, heat can thereby be further supplied to the workpiece. In principle, it is also possible if so required for the movable pressure plate 15 to be lowered and then raised again onto the layer stack 11 and the membrane 17 a number of times. The layer stack 11 can then be removed by ventilating all of the pressure chambers and the product space 20.

In all the exemplary embodiments, after the ventilation of the first pressure chamber 18 and/or the second pressure chamber 19, the possibility exists in principle of supplying further pressure to the respectively exhausted pressure chamber i.e. a pressure which is higher than atmospheric pressure in order to apply an appropriately controlled pressure to the workpiece.

It is likewise possible for the pressure in the product space not to be lowered and in particular not lowered under atmospheric pressure which leads to further alternative modes of operation.

As a result, a method and a device have thus been created which make it possible to have a combination of a flat press stage and a membrane stage in one unit. The sub-division of the second pressure chamber 19 is effected by means of a flexible gas-tight element which is preferably a peripherally clamped, gas and pressure tight fabric cloth. Due to the use of this additional flexible gas-tight element, it is possible to produce a three-chamber system which permits a separate control of a movable pressure plate 15 and a membrane 17. Nevertheless the three-chamber system can be converted into a two chamber system in the form of a flat press with a vacuum chamber by removal of the membrane. It is thus possible to have differing modes of operation in one stage such as e.g. flat pressing/membrane pressing/flat and membrane pressing. This permits the production of different photovoltaic modules in one and the same press.

In the case of a preferred embodiment, which is envisaged in particular for laminating smart glass or glass laminates with e.g. PVB or other adhesive films, there results one other mode of operation of the device.

After feeding in the layer stack 11, the laminating device closes and a pressure which is greater than atmospheric pressure is built up in the first pressure chamber 18. The movable pressure plate 15 together with the membrane 17 (insofar as one is built in) descends. The layer stack 11 receives the same heat input from both sides, i.e. in the exemplary embodiment, from above from the heatable and movable pressure plate 15 and from below from the lower part 12. After a certain time, the pressure in the first pressure chamber 18 is reduced again and the movable pressure plate 15 is pulled back upwardly again by the resilient restoring means which are provided for the purposes of compensating for the weight of the movable pressure plate 15. Subsequently, the process of evacuating the first pressure chamber 18, possibly the second pressure chamber 19, and the product space 20 is begun. Thereby, the first pressure chamber 18 and/or the second pressure chamber 19 can be ventilated arbitrarily depending upon the need, also dependent on whether the laminating device is being operated as a membrane and/or flat press. An excess pressure can also be applied to the first pressure chamber to 18 and/or the second pressure chamber 19 depending upon the need.

In this application, differing from the preceding descriptions, one does not start with a vacuum, but with pressure at least in the first pressure chamber 18. The product space 20 can, but does not have to be evacuated for this purpose.

It is self evident that this description can be subjected to the most diverse modifications, changes and adaptations which fall within the scope of equivalents to the appendant Claims.

LIST OF REFERENCE SYMBOLS

10 laminating device
11 layer stack
11a plate-like workpiece
11b adhesive layer
12 lower part
13 upper part
14 working chamber
15 movable pressure plate
16 first flexible gas-tight element
17 membrane
18 first pressure chamber
19 second pressure chamber
20 product space
21 sealing frame
22 intermediate frame
23 membrane frame
24 upper chamber frame
25, 26 gap
27 spring column
28 isolation
a-a pressing axis

The invention claimed is:

1. Laminating device for laminating, by means of at least one of pressure or heat, at least one layer stack having at least one plate-like workpiece and at least one layer that is also effective as an adhesive layer, the laminating device comprising:
   a lower part,
   an upper part which is connectable in gas-tight manner to the lower part,
   an openable and closable working chamber formed between the lower part and the upper part and configured for receiving the at least one layer stack when laminating,
   a pressure plate movable within the working chamber between the upper part and the lower part along a pressing axis,
   at least one sealing frame arranged between the lower part and the upper part,
   a plurality of mutually separable pressure chambers that are operable and arranged in the working chamber,
   wherein a plurality of mutually spaced clamping positions is arranged in a direction of the pressing axis and is configured for fixably arranging at least one flexible gas-tight element at the clamping positions and wherein, by application or non-application of pressure or negative pressure to the at least one flexible gas-tight element, the movable pressure plate is movable,
   wherein the at least one flexible gas-tight element divides the working chamber into a first pressure chamber of the mutually separable pressure chambers, the first pressure chamber being located above the at least one flexible gas-tight element, and a second pressure chamber of the mutually separable pressure chambers, the second pressure chamber being located below the at least one flexible gas-tight element and the movable pressure plate being arranged in the second pressure chamber, wherein movement of the movable pressure plate is effected due to a difference of pressure between the first pressure chamber and the second pressure chamber,
   wherein the at least one sealing frame includes at least one intermediate frame provided separately from the lower part and from the upper part,
   wherein the clamping positions are arranged at least between the at least one intermediate frame and the upper part, and between the at least one intermediate frame and the lower part,
   wherein the at least one flexible gas-tight element is clamped into a gap above the at least one intermediate frame, and a further flexible gas-tight element configured to serve as a membrane is clampable into a gap below the at least one flexible gas-tight element, and
   wherein the laminating device is configured for operating with or without the membrane.

2. The laminating device in accordance with claim 1, wherein the at least one flexible gas-tight element is at least one membrane.

3. The laminating device in accordance with claim 1, wherein, when the further flexible gas-tight element configured to serve as the membrane is clamped in place, the membrane divides the working chamber into the second pressure chamber in which the movable pressure plate is arranged, the second pressure chamber being located above the membrane, and a product space that is located below the membrane, the membrane being likewise subjectable to pressure or negative pressure.

4. The laminating device in accordance with claim 1, wherein at least three pressure chambers are provided including the first pressure chamber, the second pressure chamber, and a third pressure chamber, the first pressure chamber and the second pressure chamber being separated by the flexible gas-tight element and the second pressure chamber and the third pressure chamber being separated by the further flexible gas-tight element.

5. The laminating device in accordance with claim 1, wherein the movable pressure plate and the membrane are movable independently of each other based on the pressure in the first pressure chamber and the second pressure chamber and configured for coming into contact or non-contact with the lower part or the at least one layer stack.

6. The laminating device in accordance with claim 1, wherein
   the at least one sealing frame is formed in multiple parts arranged between the lower part and the upper part, and
   the clamping positions are arranged at gaps among the multiple parts.

7. The laminating device in accordance with claim 1,
   wherein the movable pressure plate is mounted by at least one resilient restoring means in a weight-compensated manner on the upper part, and
   wherein the movable pressure plate is a moveable upper part of a press.

8. The laminating device in accordance with claim 1, wherein the at least one sealing frame comprises a membrane frame, the at least one intermediate frame and an upper chamber frame.

9. Laminating device for laminating, by means of at least one of pressure or heat, at least one layer stack having at least one plate-like workpiece and at least one layer that is also effective as an adhesive layer, the laminating device comprising:
   a lower part,
   an upper part which is connectable in gas-tight manner to the lower part, an openable and closable working chamber formed between the lower part and the upper part and configured for receiving the at least one layer stack when laminating, a pressure plate movable within the working chamber between the upper part and the lower part along a pressing axis, at least one sealing frame arranged between the lower part and the upper part, a plurality of mutually separable pressure chambers that are operable and arranged in the working chamber, wherein a plurality of mutually spaced clamping positions is arranged in a direction of the pressing axis and is configured for fixably arranging at least one flexible gas-tight element at the clamping positions and wherein, by application or non-application of pressure or negative pressure to the at least one flexible gas-tight element, the movable pressure plate is movable, wherein the at least one flexible gas-tight element divides the working chamber into a first pressure chamber of the mutually separable pressure chambers, the first pressure chamber being located above the at least one flexible gas-tight element, and a second pressure chamber of the mutually separable pressure chambers, the second pressure chamber being located below the at least one flexible gas-tight element and the movable pressure plate being arranged in the second pressure chamber, wherein movement of the movable pressure plate is effected due to a difference of pressure between the first pressure chamber and the second pressure chamber, wherein the at least one sealing frame includes at least one intermediate frame provided separately from the lower part and from the upper part, wherein the clamping positions are arranged at least between the at least one intermediate frame and the upper part, and between the at least one intermediate frame and the lower part, wherein the at least one flexible gas-tight element is clamped into a gap above the at least one intermediate frame, and a further flexible gas-tight element configured to serve as a membrane is clampable into a gap below the at least one flexible gas-tight element, wherein the laminating device is configured for operating with or without the membrane, and wherein, when the further flexible gas-tight element is clamped in place, at least three pressure chambers are provided including the first pressure chamber, the second pressure chamber, and a third pressure chamber, the first pressure chamber and the second pressure chamber being separated by the flexible gas-tight element and the second pressure chamber and the third pressure chamber being separated by the further flexible gas-tight element.

10. Laminating device for laminating, by means of at least one of pressure or heat, at least one layer stack having at least one plate-like workpiece and at least one layer that is also effective as an adhesive layer, the laminating device comprising:

a lower part, an upper part which is connectable in gas-tight manner to the lower part, an openable and closable working chamber formed between the lower part and the upper part and configured for receiving the at least one layer stack when laminating, a pressure plate movable within the working chamber between the upper part and the lower part along a pressing axis, at least one sealing frame arranged between the lower part and the upper part, a plurality of mutually separable pressure chambers that are operable and arranged in the working chamber, wherein a plurality of mutually spaced clamping positions is arranged in a direction of the pressing axis and is configured for fixably arranging at least one flexible gas-tight element at the clamping positions and wherein, by application or non-application of pressure or negative pressure to the at least one flexible gas-tight element, the movable pressure plate is movable, wherein the at least one flexible gas-tight element divides the working chamber into a first pressure chamber of the mutually separable pressure chambers, the first pressure chamber being located above the at least one flexible gas-tight element, and a second pressure chamber of the mutually separable pressure chambers, the second pressure chamber being located below the at least one flexible gas-tight element and the movable pressure plate being arranged in the second pressure chamber, wherein movement of the movable pressure plate is effected due to a difference of pressure between the first pressure chamber and the second pressure chamber, wherein the at least one sealing frame includes at least one intermediate frame provided separately from the lower part and from the upper part, wherein the clamping positions are arranged at least between the at least one intermediate frame and the upper part, and between the at least one intermediate frame and the lower part, wherein the at least one flexible gas-tight element is clamped into a gap above the at least one intermediate frame, and a further flexible gas-tight element configured to serve as a membrane is removable from a gap below the at least one flexible gas-tight element, and wherein the laminating device is configured for operating with or without the membrane.

11. The laminating device in accordance with claim 1, wherein the at least one sealing frame comprises a membrane frame at a level of the membrane and an upper chamber frame at a level of the first pressure chamber, and wherein the at least one intermediate frame is at a level of the second pressure chamber.

12. The laminating device in accordance with claim 1, wherein at least one flexible gas-tight element and the membrane are separated by the second pressure chamber.

* * * * *